United States Patent Office 3,676,154
Patented July 11, 1972

3,676,154
SHELF STABLE TOMATO SOUP CONCENTRATE
George Glasser, Ossining, Ragnar Edward Sjonvall, East Chester, and Milton Kaplow, White Plains, N.Y., assignors to General Foods Corporation, White Plains, N.Y.
No Drawing. Filed Apr. 3, 1970, Ser. No. 25,590
Int. Cl. A23l 1/40
U.S. Cl. 99—124          4 Claims

ABSTRACT OF THE DISCLOSURE

A tomato soup concentrate is prepared with a water soluble solids content sufficient to provide microbiological stability at room temperature conditions without the need for commercial sterilization; also, the level of soluble solids prevents the soup concentrate from solidifying at home freezer temperatures (0° F. to 15° F.) and thereby effects a readily spoonable, semi-frozen consistency which lends itself to single serving dispensing and dilution with hot water to form an excellent quality soup.

BACKGROUND OF THE INVENTION

Field of the invention

This invention is related to soup concentrates, and in particular, the invention is directed to a tomato soup concentrate which, upon being packaged in a hermetically sealed pouch or other such sealed container without the necessity of retorting, is stable at room temperature storage conditions and is transformed to a spoonable plastic physical state when stored for an extended time period at home freezer temperature conditions.

DESCRIPTION OF THE PRIOR ART

The outstanding disadvantage of conventional canned soups and soup concentrates is the degradation of the desirable delicate flavor and textural features of the natural vegetable and meat ingredients formulated in the soup mixture when the mixture is heat processed after canning to effect commercial sterilization. Many canned soups have a detectable off-flavor, usually characterized as a caramelized flavor, attributable to the prolonged, high temperature processing after canning whereof the soup content near the wall of the container is subjected to excessive heat incident to assuring the remaining content to be adequately processed.

Dehydrated soup mixtures, in addition to requiring boiling, or at least simmering, to reconstitute the dried particulates of the mixture to a soft textural state in a reasonable period of time, also have the flavor deficiencies generally associated with dehydrated vegetables and meats.

Frozen soups, wherein the liquid and particulates are converted to a rigid solid state during the processing of the comestibles, upon thawing and heating for consumption, are known to exhibit poor textural quality which is attributed to the inability of the soup ingredients, especially the cellular or fibrous particulates, to withstand freeze-thaw temperature cycle conditions.

The above-mentioned significant disadvantages manifested in conventional soups and dry soup mixes have been universally recognized and the prior art has long sought a means to provide a soup product which, in addition to being amenable to convenient, rapid preparation on the part of the housewife, would have the excellent flavor and textural qualities associated with freshly prepared "home-made" soups. The present invention is intended to satisfy such requirements.

SUMMARY OF THE INVENTION

It will thus be appreciated that the soup concentrate of this invention provides for a basic comestible having excellent consumer flavor and texture appeal.

It is another object of the instant invention to provide a soup concentrate which is easily and conveniently prepared for consumption.

It is still another object of the invention to provide a soup concentrate which, upon being hermetically packaged, and without further heat processing after packaging, is microbiologically stable at room temperature conditions for extended periods of time.

It is yet another object of the present invention to provide a soup concentrate which, upon storage in a freezer cabinet where ambient temperature is in the approximate range of 0° F. to 15° F., will not solidify, but rather, will form an easily spoonable mass having a plastic-type consistency.

It is a feature of the invention that the soup concentrate can be packaged in multi-serving size quantities and, when chilled to home freezer temperatures may be easily spooned from the package in amounts sufficient for dilution with hot water to satisfy individual serving requirements.

It is another feature of the instant invention that, since no post packaging heating processing is required, the soup concentrate of the invention can be packaged in a relatively inexpensive container such as a rigid plastic cup-like container or a pliable plastic envelope.

It is a further feature of the invention that the soup concentrate thereof is of such paste-like consistency when chilled at home freezer temperatures it lends itself to packaging in a plastic tube-type container for convenient, tidy, and accurate quantity dispensing.

Briefly, the above and additional objects and features of the invention are accomplished by formulating a mixture of soup ingredients which, in addition to affording excellent flavor and texture to the finished tomato soup product, cooperate to resist microbiological spoilage at room temperatures and prohibit solidification at temperatures in the neighborhood of 0° F. to 15° F.

The formulation of the tomato soup concentrate of the invention is tailored to limit the water activity ($A_w$)* of the soup concentrate mixture to a sufficiently low level whereat food spoilage bacteria growth is inhibited when the product is is maintained at ambient temperature conditions over prolonged periods of time.

Water activity ($A_w$) is a fundamental property of aqueous solutions and by definition $$A_W = \frac{p}{p_o}$$

where $p$ and $p_o$ are the vapor pressures of the solution and solvent respectively. For an ideal solution, $A_w$ is independent of temperature; and in actual practice, the $A_w$ of a given solution varies only slightly with temperature within the range of temperature permitting microbial growth.

As the $A_w$ of the solution is reduced below an optimum level, such as by adding solutes in controlled amounts, there is a decrease in the rate of microbial growth. The range of $A_w$ over which microbial growth has been demonstrated is from about 0.999 to about 0.62. Within these limits, each organism will have its own characteristic range within which it can grow and a great many bacteria will grow only at an $A_w$ above about 0.94 to 0.95.

*The effect of water activity on the microbiological stability of food is comprehensively discussed in Scott, W. J., "Water Relations of Food Spoilage Microorganisms," Advances in Food Research 7, 83–127 (1957).

Furthermore, the tomato soup concentrate formulation is structured to prevent the segregation of water in the form of large water ice crystals when the soup concentrate is chilled to below 15° F. Rather, the essential ingredients in the tomato soup concentrate formulation of the invention cooperate in synergetic fashion to favor the maintenance of small ice crystal formations in a substantially uniformly dispersed state throughout a semi-rigid matrix of substantially non-aqueous material.

The invention is predicated on the discovery that a tomato soup concentrate formulation can be compounded which functions to assure microbiological stability by lowering the chemical activity of the water content to a required minimum and also functions to prevent physical separation of the water content from the remaining material when the soup concentrate is chilled below water freezing temperatures to the degree that the water does not form large segregated ice masses. Importantly, both of these functions are effected with conventional food ingredients which also serve to provide a finished tomato soup product with excellent organoleptic features.

The essence of the invention resides in the discovery that conventional soup ingredients which are water soluble and those which are water insoluble, when combined with a limited amount of water in correct proportions, will cooperate to:

(1) lower the water activity of the tomato soup concentrate to the point where the concentrate is stable at room temperature,
(2) prevent the concentrate from rigidly freezing when subjected to a temperature of about 0° F.–15° F., and
(3) provide excellent flavor and textural components such that when the concentrate is diluted with approximately 4 to 7 parts of boiling water (depending on individual preference), a high quality tomato soup beverage is prepared.

DESCRIPTION OF THE PREFERRED EMBODIMENT

Within the recent past, considerable knowledge has been obtained concerning the relationship between the chemically bound water content, the water soluble solids content, the water insoluble solids content and the free water of a food and the effect of this relationship on the capability of the food to resist microbiological spoilage. Burgess, et al. U.S. Pat. 3,202,514 and DuPuis U.S. Pat. 3,489,574 have discovered methods of putting this information to practical commercial use in the embodiments of soft, semi-moist foods which do not require refrigeration to maintain microbioligical stability.

Within present knowledge, however, the prior art has not discovered how the principle of properly effecting the aforementioned relationship can be utilized to preserve the initial flavorable impact of a soup concentrate without the requirement for such exotic ingredients as propylene glycol and other polyhydric alcohols.

The water soluble solids incorporated in the soup concentrate of the instant invention enhance the flavor, control the water activity, and inhibit the freezing (solidification) of the mixture. For such three-fold purposes, salt (sodium chloride) mono or di-saccharides and monosodium glutamate are the three basic ingredients employed in proper proportional amounts and combined total quantity in the soup concentrate of the invention. The amount of this combination of water soluble solids is formulated such that the total concentrate mixture will have a water activity ($A_w$) ranging from about 0.80 to about 0.87 and will be low enough to assure microbiological stability of the mixture at ambient temperature conditions. In addition to maintaining the water activity at an adequately reduced level plus enhancing the flavor, the water soluble solids constituents, in combination, will cooperate with the water insoluble materials and the free water to inhibit the tomato soup concentrate from solidifying at freezer temperatures ranging from about 0° F. to about 15° F.

The water insoluble materials included in the group concentrate of the invention are of two general types—powders or fine granules, and fats or oils at levels of 10 to 20 weight percent.

The food powders serve to enhance the flavor of the soup concentrate and, for this purpose, such ingredients as garlic, pepper, celery seed, onion, potato starch are used.

In accordance with the invention other water insoluble ingredients, such as butter oil, is employed in the soup concentrate formulation to provide flavor and texture appeal.

Understandably, there is some latitude with respect to the actual ingredients formulated in the soup concentrate; however, it is essential that the soup concentrate of this invention be formulated with water soluble solids which maintain the water activity of the total mixture at a level below about 0.87 and the combined weight fraction of water soluble solids and water insoluble solids of the concentrate range from about 58% to about 65% of the total weight of the concentrate. In other terms, the soup concentrate, in order to fall within the province of the invention must have a water activity below 0.87 and a total moisture content ranging from about 35 to about 42 weight percent based on the weight of the concentrate.

The term free water as used for purposes of this invention designates water which is not chemically bound with the solids content of the concentrate.

The soup concentrate of the invention is hygroscopic and it is, therefore, essential that it be packed in a hermetically sealed container. Inexpensive plastic envelopes are suitable for such purpose.

The following example illustrates in detail the various facets of the invention. It should be understood, however, that this example is meant to be illustrative and the invention is not to be limited thereto.

EXAMPLE.—FROZEN SPOONABLE TOMATO SOUP CONCENTRATE (1) Formulation

| Ingredients | Grams/batch | Weight percent |
|---|---|---|
| Tomato paste (30% solids) | 23.0800 | 60.25 |
| Onion powder, raw | 0.0034 | 0.009 |
| Salt | 3.4440 | 8.994 |
| Sugar | 5.4590 | 14.254 |
| White pepper, ground | 0.0038 | 0.010 |
| Monosodium glutamate | 0.0084 | 0.022 |
| Celery seed powder | 0.0011 | 0.003 |
| Potato starch, raw | 3.8490 | 10.051 |
| Butter oil | 2.4510 | 6.401 |
| Total | 38.30 | 100.00 |

(2) Preparation (1) Blend all dry ingredients with the tomato paste for 5 minutes at speed No. 1 in a 5 quart Hobart Mixer.
(2) Add the butter oil, blend an additional 10 minutes at speed No. 1, then 5 minutes longer at speed No. 2 in the Hobart Mixer.
(3) Package the contents of (2) in a hermetically sealed plastic pouch and store in freezer cabinet at 0° F. to 15° F.

(3) Recipe

Empty the contents (about 38 grams) of the package by spooning it into 200 mls. (about 1 cup) of boiling water and stir well.

In summary, conventional food ingredients, without the use of such exotic materials as polyhydric alcohols, are formulated into a tomato soup concentrate which is room temperature stable, does not solidify at freezer temperatures of about 0° F. to about 15° F. and, when diluted with hot water, is converted to a soup having excellent flavor and mouthfeel qualities.

While the invention has been illustrated by reference to specific embodiments, there is no intent to limit the spirit or scope of the invention to the preicse details so set forth, except as defined in the following claims.

Having described what is new and desired to be secured by Letters Patent, we claim.

1. A concentrate having the property of plastic consistency at temperatures ranging from about 0° F. to about 15° F. and adapted upon the addition of water to form a tomato soup, said concentrate consisting essentially of;
   (a) tomato solids,
   (b) water soluble solids consisting of a mixture of sodium chloride, monosodium glutamate, and monosaccharides or sugar an amount sufficient to maintain the water activity of said concentrate at a level below 0.87,
   (c) water insoluble food material including fat and food powders selected from the group consisting of onion powders, pepper powder, celery powder, starch, and mixtures thereof in combination in an amount ranging from about 10 to about 20 weight percent based on the weight of the wet concentrate, and
   (d) a moisture content ranging from about 35 to about 42 weight percent based on the weight of the wet concentrate.

2. The concentrate of claim 1 wherein the water activity ranges from about 0.80 to about 0.87.

3. The invention of claim 1 wherein the water soluble ingredients comprise about 45 to about 48 weight percent of the concentrate.

4. A soup product prepared from the concentrate of claim 1 by dilution of the said soup concentrate with hot water in amounts ranging from 4 to 7 parts by weight of water to 1 part by weight of soup concentrate.

References Cited

UNITED STATES PATENTS

| | | | |
|---|---|---|---|
| 2,357,585 | 9/1944 | Galvin | 99—124 X |
| 3,111,408 | 11/1963 | Cheng | 99—123 X |
| 3,116,151 | 12/1963 | Giddey | 99—123 X |
| 3,516,838 | 6/1970 | DuPuis | 99—18 X |

FOREIGN PATENTS

| | | | |
|---|---|---|---|
| 298,873 | 7/1932 | Italy | 99—124 |
| 3,368,669 | 6/1964 | France | 99—124 |

FRANK W. LUTTER, Primary Examiner

R. HALPER, Assistant Examiner

U.S. Cl. X.R.

99—18

UNITED STATES PATENT AND TRADEMARK OFFICE
Certificate

Patent No. 3,676,154                       Patented July 11, 1972

George Glasser, Ragnar Edward Sjonvall and Milton Kaplow

Application having been made by George Glasser, Ragnar Edward Sjonvall and Milton Kaplow, the inventors named in the patent above identified, and General Foods Corporation, White Plains, New York, the assignee for the issuance of a certificate under the provisions of Title 35, Section 256, of the United States Code, deleting the names of Ragnar Edward Sjonvall and Milton Kaplow as joint inventors, and a showing and proof of facts satisfying the requirements of the said section having been submitted, it is this 29th day of August 1978, certified that the names of the said Ragnar Edward Sjonvall and Milton Kaplow are hereby deleted from the said patent as joint inventors with the said George Glasser.

FRED W. SHERLING,
*Associate Solicitor.*